(12) United States Patent
Kant et al.

(10) Patent No.: US 6,751,068 B1
(45) Date of Patent: Jun. 15, 2004

(54) ACTUATOR ASSEMBLY FOR A DISC DRIVE HAVING SHELL EXTENSIONS

(75) Inventors: Rishi Kant, Boulder, CO (US); Alexander W. Chang, Longmont, CO (US); Steven R. Speckmann, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 245 days.

(21) Appl. No.: 09/826,586

(22) Filed: Apr. 5, 2001

Related U.S. Application Data

(60) Provisional application No. 60/242,779, filed on Oct. 24, 2000.

(51) Int. Cl.$^7$ ................................................ G11B 5/55
(52) U.S. Cl. ................................. 360/266; 360/265.8
(58) Field of Search .................... 360/265.8, 265.9, 360/266, 97.01, 98.01

(56) References Cited

U.S. PATENT DOCUMENTS

| | | | |
|---|---|---|---|
| 4,884,154 A | 11/1989 | Onodera et al. .......... 360/244.9 |
| 5,214,552 A * | 5/1993 | Haga ....................... 360/264.7 |
| 5,408,372 A | 4/1995 | Karam, II ................ 360/244.2 |
| 5,570,249 A | 10/1996 | Aoyagi et al. ........... 360/244.2 |
| 5,677,815 A * | 10/1997 | Chan ....................... 360/265.7 |
| 5,734,528 A * | 3/1998 | Jabbari et al. ............... 360/265 |
| 5,777,826 A | 7/1998 | Tsuchida et al. ......... 360/244.9 |
| 5,786,961 A | 7/1998 | Goss ........................ 360/245.1 |
| 5,815,348 A | 9/1998 | Danielson et al. ....... 360/244.9 |
| 5,844,752 A | 12/1998 | Bozorgi et al. .......... 360/244.9 |
| 5,854,725 A * | 12/1998 | Lee ............................. 360/266 |
| 5,946,164 A | 8/1999 | Tracy ...................... 360/244.5 |
| 5,999,369 A | 12/1999 | Shimizu et al. .......... 360/244.5 |
| 5,999,372 A * | 12/1999 | Peterson et al. ......... 360/265.9 |
| 6,078,477 A * | 6/2000 | Adams et al. ............ 360/265.8 |
| 6,366,432 B1 * | 4/2002 | Tadepalli et al. ........... 360/266 |
| 6,442,002 B1 * | 8/2002 | Pan ......................... 360/266.1 |
| 6,466,414 B1 * | 10/2002 | Chung et al. ............ 360/265.7 |
| 6,473,271 B1 * | 10/2002 | Rahman et al. ............. 360/266 |
| 6,477,017 B2 * | 11/2002 | Kohei et al. ............. 360/265.9 |

* cited by examiner

Primary Examiner—Jefferson Evans
(74) Attorney, Agent, or Firm—Fellers, Snider, et al.

(57) ABSTRACT

An actuator assembly is provided for a computer disc drive. The actuator assembly includes an actuator body that supports a shell head support arm and/or a shell coil yoke. The coil yoke supports the coil of the VCM. The actuator body pivots about a pivot axis and is attached to the cartridge bearing assembly disposed within an inner hollow of the actuator body. The head support arm is a shell having a core, a first surface and a second surface. The first surface of the head support arm is concave and the second surface of the head support arm is convex. The head support arm is connected to the actuator body at a proximal end. At a distal end of the head support arm, there is a flat portion with a swage hole for connection of the flexure assembly.

16 Claims, 5 Drawing Sheets

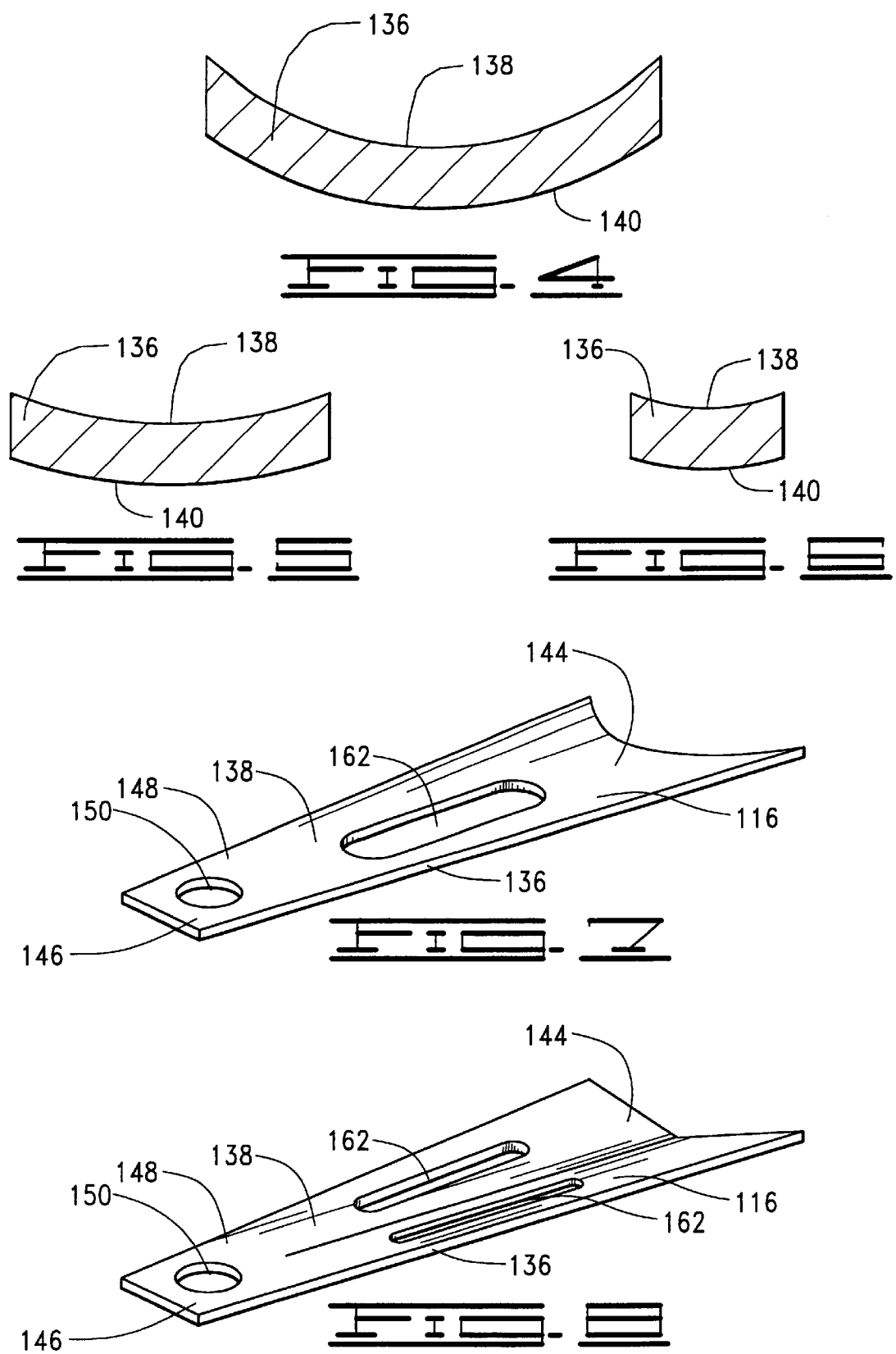

ACTUATOR ASSEMBLY FOR A DISC DRIVE HAVING SHELL EXTENSIONS

RELATED APPLICATIONS

This application claims priority to United States Provisional Application No. 60/242,779, filed Oct. 24, 2000.

FIELD OF THE INVENTION

This application relates generally to the field of disc drive storage devices, and more particularly, but not by way of limitation, to a disc drive actuator assembly with improved inertial and vibration characteristics.

BACKGROUND OF THE INVENTION

Computers commonly use hard disc drives to store large amounts of data in a form that can be readily accessed by a user. A disc drive generally includes a stack of vertically spaced magnetic discs that are rotated at a constant high speed by a spindle motor. The surface of each disc is divided into a series of concentric, radially spaced data tracks in which data are stored in the form of magnetic flux transitions. Typically, each data track is divided into a number of data sectors that store data blocks of a fixed size.

Data are stored and accessed on the discs by an array of read/write transducers (heads) mounted to a rotary actuator. Typically, the actuator includes one or more head support arms which project outwardly from a portion of the actuator that pivots about a shaft secured to a base deck of the disc drive. The stacked discs and head support arms are configured so that the surfaces of the stacked discs are accessible to the heads mounted on the complementary stack of head support arms. Head conductors included on the actuator assembly conduct electrical signals from the heads to a flex circuit, which in turn conducts the electrical signals to a printed circuit board (PCB).

The actuator assembly is mounted disc drive at a position closely adjacent the outer diameter of the discs. The actuator assembly includes a coil which, as part of a voice coil motor (VCM), causes the head support arms and the heads to be pivotally moved about a shaft. Thus, the head support arms move in a plane parallel to the surfaces of the discs to position a head over a selected data track.

The VCM includes a coil mounted radially outward from the cartridge assembly, the coil being immersed in a magnetic field of a magnetic circuit of the VCM. The magnetic circuit includes one or more permanent magnets and magnetically permeable pole pieces. When current is passed through the coil, an electromagnetic field is established which interacts with the magnetic field of the magnetic circuit so that the coil moves in accordance with well-known Lorentz relationship. As the coil moves, the actuator assembly pivots about the shaft and the heads move across the disc surfaces.

Each of the heads is mounted to a head support arm by a flexure that attaches to an end of the head support arm. Each head includes an interactive element such as a magnetic transducer. The transducer either (1) senses the magnetic transitions on a selected data track to read the data stored on the track, or (2) transmits an electrical signal that induces the magnetic transitions on the selected data track to write data to the data track. Air currents are caused by the high-speed rotation of the discs. A slider assembly included on each head has an air bearing surface that interacts with the air currents to cause the head to fly at a short distance above the data tracks on the disc surface.

In order to improve data access performance of a disc drive, it is generally desirable to maximize the stiffness and to minimize the inertia of the actuator assembly. A stiffer system has a faster response time, because an increase in stiffness reduces the "settle" time at the desired read or write location. A stiffer system also minimizes vibrations that cause errors in reading and writing information from the heads to the discs. A lower inertia allows an actuator assembly to be moved quickly from one location to another without excessive power requirements.

Several mechanical properties affect the stiffness and the inertia of a mechanical system, including: (1) material density for the various components of the actuator assembly; (2) flexural rigidity; and (3) specific modulus. For a given specification of physical dimensions, minimizing the material density minimizes the mass of the actuator assembly, which in turn minimizes the inertia. The flexural rigidity, or bending modulus, of a head support arm is the elastic modulus (E) of the material multiplied by the moment of inertia (I) of the head support arm. The specific modulus is the elastic modulus of the material divided by the density of the material. The specific modulus may be thought of as a measure of the stiffness per unit mass of a beam. For the same design, an actuator built with a higher modulus material will have higher critical natural resonances.

In the case of an actuator assembly for a disc drive, there are two types of vibration that one is concerned with: (1) angular vibration caused by rapid pivoting and stopping of pivoting of the actuator assembly; and (2) a transverse vibration normal to the plane of pivoting of the actuator assembly. In the case of transverse vibration, the neutral axis is defined by a horizontal plane at some fixed height along the pivot axis.

The actuator assembly has as its first major vibrational mode in the cross-track direction a mode called the "butterfly mode." The butterfly mode of vibration refers to an angular vibration that occurs when the coil yoke and the head support arm, in pivoting about the shaft, move toward one another. Ultimately, one is primarily concerned with the vibration of the head support arm, because it supports the read/write heads. However, it is also desirable to minimize the vibration of the coil yoke, because it is mechanically coupled to the head support arm.

For a beam, assuming other properties are constant, the stiffness of the beam increases as I increases, where I is the moment of inertia of a cross-section of the beam about a neutral axis. It has been a well-known principle in the construction industry that an I-beam deflects less than a solid beam of an equivalent mass and an equivalent modulus of elasticity. This is true because an I-beam has a larger moment of inertia than a solid beam. The I-beam has a larger moment of inertia than a solid beam because much of its mass is "spaced" away from the neutral axis of the beam. Because the moment of inertia is larger, the I-beam is generally stiffer than the solid beam of an equivalent mass. For any arbitrary beam, according to the beam flexure formula:

$\sigma = My/I$, where $\sigma$ = a stress at some point in the beam

M = an applied bending moment;

y = a distance from a neutral axis of the beam; and

I = a moment of inertia about the neutral axis.

For a point on the surface of the beam, this formula becomes:

$\sigma_{max} = My_{max}/I = M/c$ where $c = I/Y_{max}$ = elastic section modulus.

Because of these properties, it is desirable to apply the same principles of I-beam stiffness to configure a head support arm and a coil yoke with a maximum stiffness and a minimum mass.

Thus, there is a need for a geometric configuration for a head support arm and a coil yoke with a relatively large moment of inertia and a relatively low mass.

SUMMARY OF INVENTION

The present invention is for an actuator assembly having an actuator body, from which project shell extensions. The shell extensions may be head support arms or a coil yoke. Shell structures, or shells, typically have a higher moment of inertia than flat solid structures. A shell is a three-dimensional curved structure with one of its dimensions, a thickness, much smaller than its other two dimensions. Shells are best visualized by first picturing a flat plate of a uniform thickness, and then picturing deforming the plate so that one of its surfaces is concave, one of its surfaces is convex, and the two surfaces are still separated by the thickness of the plate.

An actuator assembly is provided for a computer disc drive. The actuator assembly includes an actuator body that supports a head support arm and a coil yoke. The coil yoke supports the coil of the VCM. The actuator body pivots about a pivot axis and is attached to the cartridge bearing assembly disposed within an inner hollow of the actuator body.

The head support arm is a shell having a core, a first surface and a second surface. The first surface is concave and the second surface is convex. The head support arm is connected to the actuator body at a proximal end of the head support arm. At a distal end of the head support arm, there is a flat portion with a swage hole for connection of the flexure assembly. The coil yoke has a first surface, a second surface, and a coil yoke core separating the two surfaces.

These and other features and advantages which characterize the present invention will be apparent from the following detailed description and a review of the associated drawings.

BRIEF DESCRIPTION OF THE DRAWINGS

FIG. 4 is a cross-sectional profile of the section 4—4 shown in FIG. 2.

FIG. 5 is a cross-sectional profile of the section 5—5 shown in FIG. 2.

FIG. 6 is a cross-sectional profile of the section 6—6 shown in FIG. 2.

FIG. 7 is an isometric view of a head support arm constructed in accordance with a preferred embodiment of the present invention.

FIG. 8 is an isometric view of a head support arm constructed in accordance with a preferred embodiment of the present invention.

DETAILED DESCRIPTION

Figure 1:
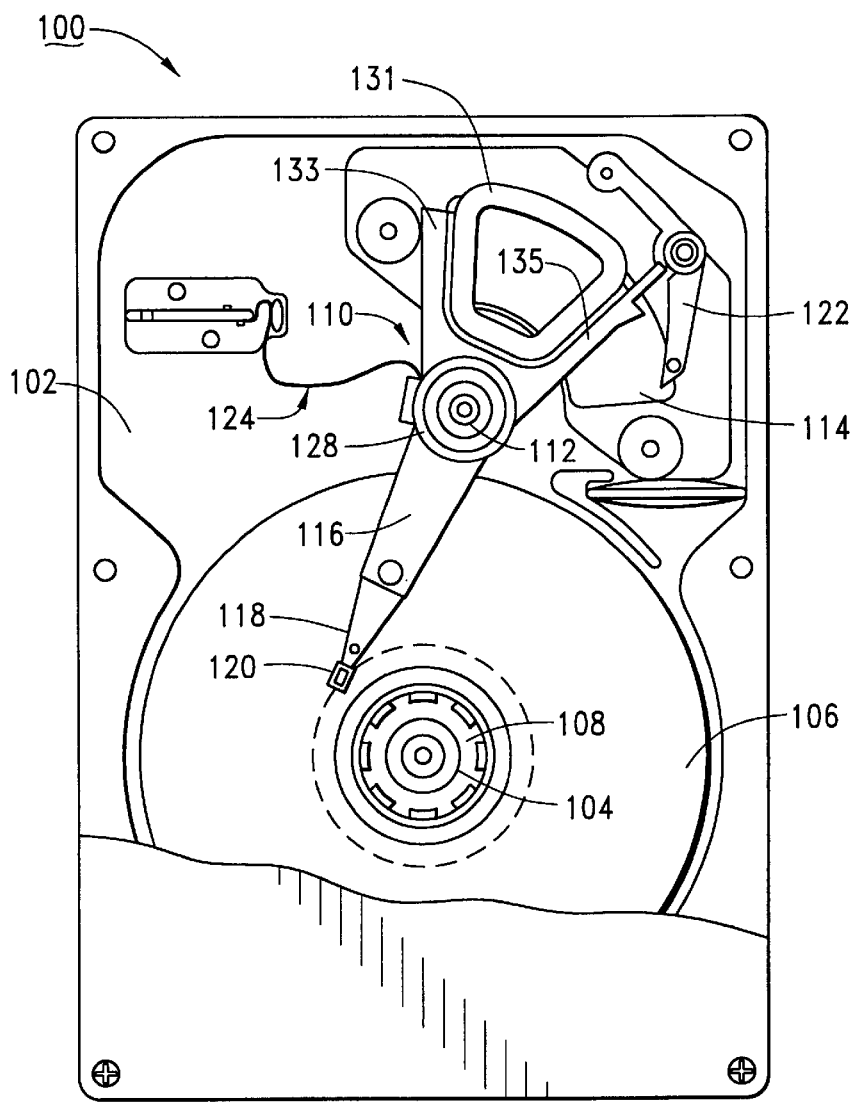
FIG. 1 is a top view of a disc drive constructed in accordance with a preferred embodiment of the present invention.

Turning now to the drawings and more particularly to FIG. 1, shown therein is a top plan view of a disc drive 100 constructed in accordance with a preferred embodiment of the present invention. The disc drive 100 includes a base deck to which various components of the disc drive are mounted. A top cover, partially shown in FIG. 1, cooperates with the base deck 102 to form an internal sealed environment for the disc drive 100.

A spindle motor 104 is provided to rotate a stack of discs 106 at a constant high speed. A disc clamp 108 secures the discs to a hub (not separately designated) of the spindle motor 104.

To transfer data to and from the discs 106, a controllably positionable actuator assembly 110 is provided which pivots about a pivot shaft 112 in response to currents applied to a coil (not separately designated) of a voice coil motor (VCM) 114. The actuator assembly 110 includes head support arms 116 from which corresponding flexure assemblies 118 extend. Heads 120 are provided at distal ends of the flexure assemblies 11 8 and are supported over the discs 106 by air bearings established by the air currents set up by the rotation of the discs 106. A latch assembly 122 is provided to secure the heads 120 over landing zones at the innermost diameter of the discs 106 when the disc drive 100 is deactivated. A flex circuit 124 provides electrical communication paths between the actuator assembly 110 and a disc drive printed circuit board (not shown in FIG. 1) mounted to the underside of the disc drive 100 in a conventional manner.

Before describing the head support arm and the coil yoke, it is useful to first discuss a class of three-dimensional objects for which one of the dimensions of the object, called a thickness, is relatively small compared with the other two dimensions of the object. The other two dimensions of the object form either a planar or a curved surface. When the other two dimensions of the object form a planar surface, the object is defined to be a plate. When the other two dimensions of the object form a curved surface, the object is defined to be a shell.

A common example of a closed, bounded, and oval-shaped shell is an eggshell. In the present application, the term shell only refers to open shells. For illustrative purposes, it is more useful to think of open shells as flat plates that have been bent to form curved upper and lower surfaces. Although it is common for shells to have a uniform thickness, as used herein, the thickness of a shell may vary.

Referring now to FIGS. 2–6, shown therein are various views of the actuator assembly constructed in accordance with one embodiment of the present invention. For the purpose of clarity, the flexure assembly 118 and the heads 120 have been omitted from FIGS. 2–16. An actuator body 128 supports head support arms 116 and a coil yoke 130, both of which are referred to herein as extensions. The actuator body 128 pivots about a pivot axis 132.

Figure 2:
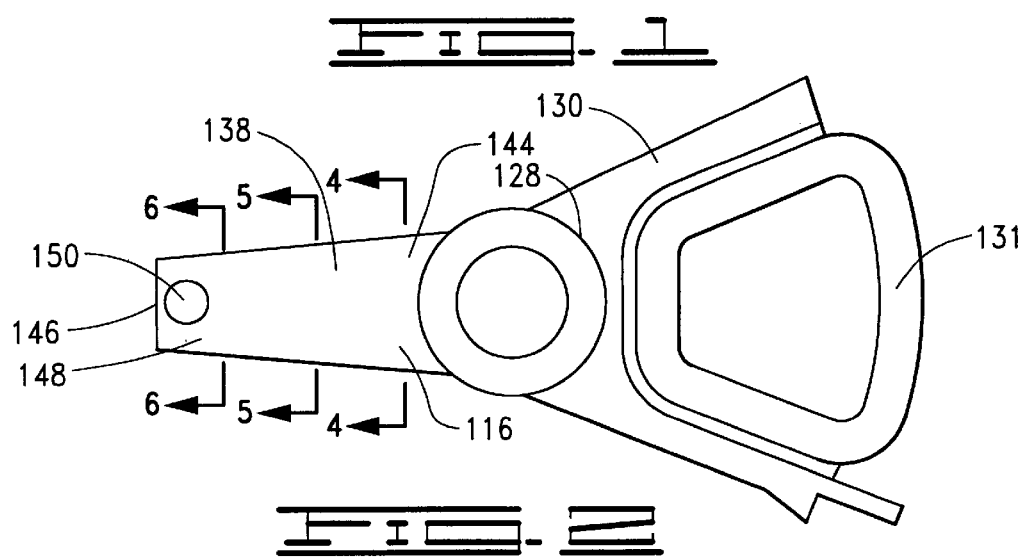
FIG. 2 is a top view of an actuator assembly constructed in accordance with a preferred embodiment of the present invention.

As shown in the embodiment of FIGS. 2–6, each of the head support arms 116 is a shell having a core 136, a first surface 138 and a second surface 140 (not visible in FIG. 2). For each of the head support arms 116, the first surface 138 is concave and the second surface 140 is convex. Each of the head support arms 116 is connected to the actuator body 128 at a proximal end 144 of the head support arms 116. As seen in FIGS. 4–6, the cross-sectional profile of the upper head support arm 116 tapers from being very curved at the proximal end 144 in FIG. 4 to being nearly flat near a distal end 146 in FIG. 6. At the distal end 146, there is a flat portion 148 with a swage hole 150 for connection of the flexure assembly 118.

Figure 3:
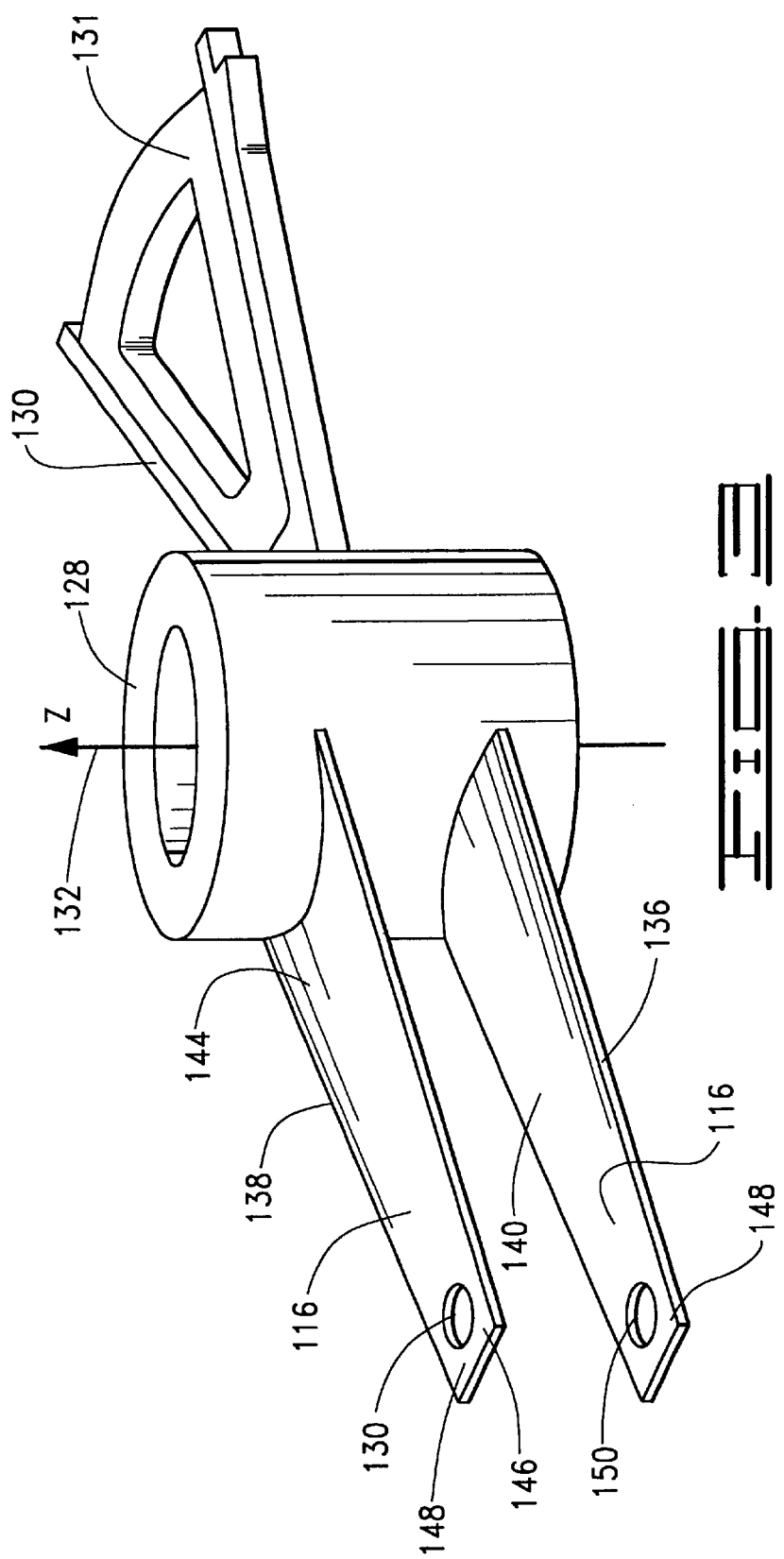
FIG. 3 is an isometric view of an actuator assembly constructed in accordance with a preferred embodiment of the present invention.

Referring to FIGS. 2 and 3, the coil yoke 130 extends from the actuator body 128. The coil yoke 130 supports a coil 131 of a voice coil motor (VCM). The coil yoke 130 for the embodiment shown in FIGS. 2–6 is not a shell, but is instead a plate-type structure.

FIG. 7 shows an isometric view of an embodiment of a head support arm 116. In FIG. 7, a shell core 136 separates a first surface 138 from a second surface 140. The head support arm 116 has a curved cross-sectional profile at a proximal end 144 and a flat cross-sectional profile at a distal end 146. There is a swage hole 150 in the flat portion 148 for attachment of a flexure. For the particular embodiment shown in FIG. 7, there is a lightening hole 162 that reduces the mass of the head support arm 116, and thereby reduces its inertia when the actuator assembly 110 is pivoted about the pivot axis 132.

FIG. 8 shows an isometric view of an embodiment of a shell head support arm 116. In FIG. 8, a shell core 136 separates a first surface 138 from a second surface 140. The head support arm 116 has a V-shaped cross-sectional profile at a proximal end 144 and a flat cross-sectional profile at a distal end 146. For the V-shaped cross-sectional profile, each of the first surface 138 and the second surface 140 form a portion (two sides) of a triangle. There is a swage hole 150 in the flat portion 148 for attachment of a flexure. For the particular embodiment shown in FIG. 8, there are two lightening holes 162 that reduce the mass of the head support arm 116, and thereby reduce its inertia when the actuator assembly 110 is pivoted about the pivot axis 132.

Figure 9:
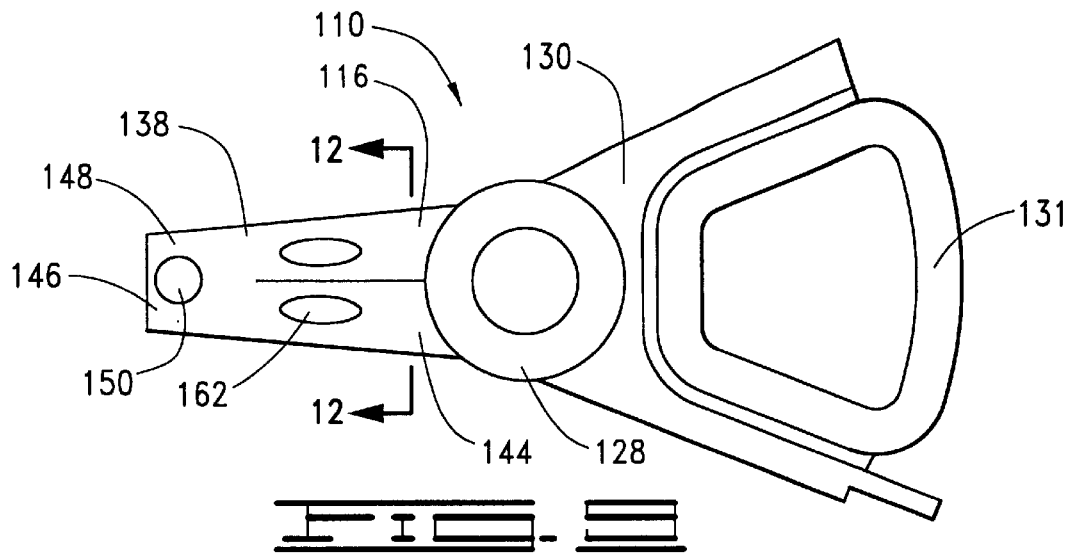
FIG. 9 is a top view of an actuator assembly having the head support arm shown in FIG. 8.

FIG. 9 is a top view of an actuator assembly 110 having the head support arm 116 shown in FIG. 8. The actuator assembly 110 includes an actuator body 128. A coil yoke 130, which supports a coil 130, extends from the actuator body 128. The head support arm 116 is a shell having a core 136 that separates a first surface 138 from a second surface 140. The head support arm 116 has a V-shaped cross-sectional profile at a proximal end 144 and a flat cross-sectional profile at a distal end 146. There is a swage hole 150 in the flat portion 148 for attachment of a flexure.

Figure 10:
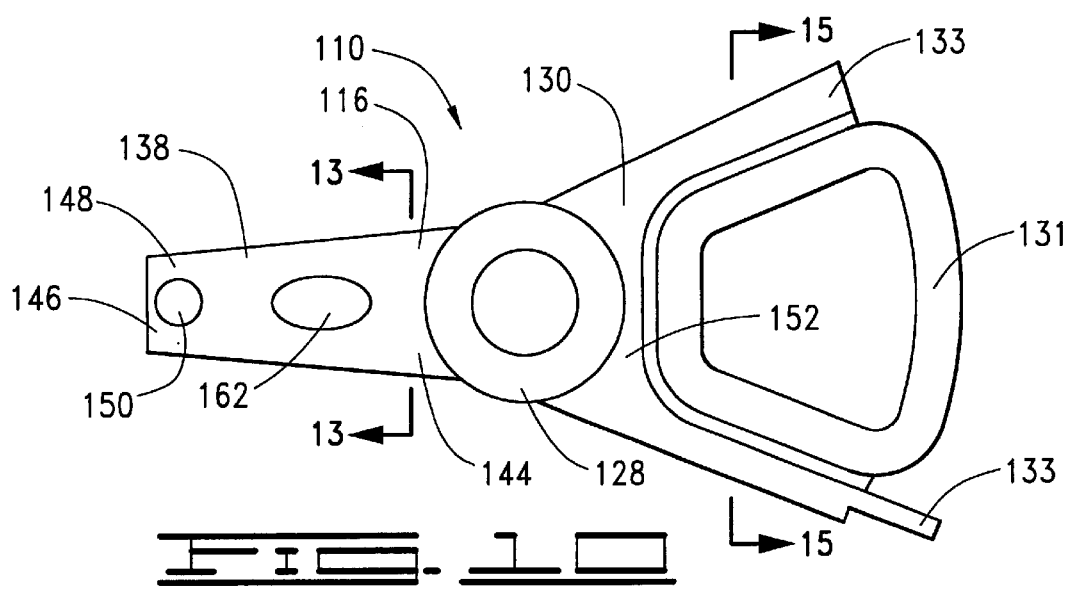
FIG. 10 is a top view of an actuator assembly having the head support arm shown in FIG. 7.

FIG. 10 is a top view of an actuator assembly 110 having the head support arm shown in FIG. 7. The actuator assembly 110 includes an actuator body 128. A coil yoke 130, which supports a coil 130, extends from the actuator body 128. The head support arm 116 is a shell having a core 136 that separates a first surface 138 from a second surface 140. The head support arm 116 has a curved cross-sectional profile at a proximal end 144 and a flat cross-sectional profile at a distal end 146. There is a swage hole 150 in the flat portion 148 for attachment of a flexure.

Figure 11:
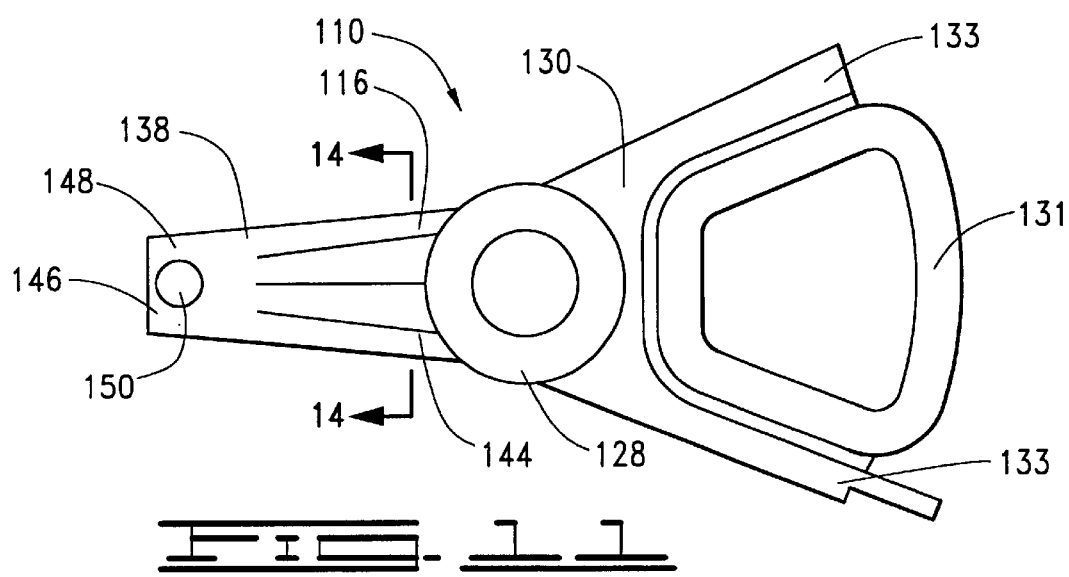
FIG. 11 is a top view of an actuator assembly constructed in accordance with a preferred embodiment of the present invention.
Figure 14:
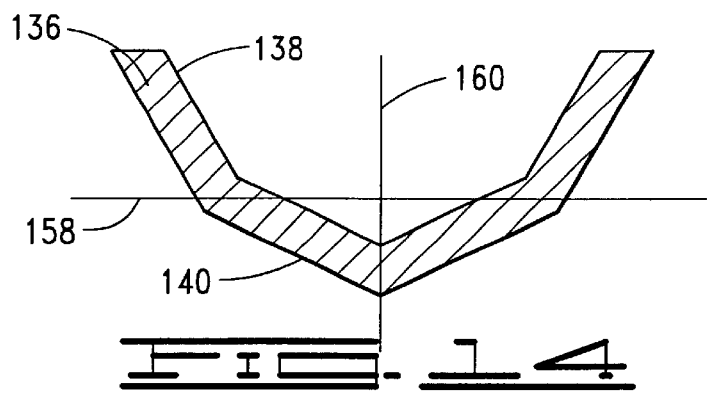
FIG. 14 is a cross-sectional profile of the section 14—14 shown in FIG. 11.

FIG. 11 is a top view of another embodiment of an actuator assembly 110. The actuator assembly 110 includes an actuator body 128. A coil yoke 130, which supports a coil 130, extends from the actuator body 128. The head support arm 116 is a shell having a shell core 136 that separates a first surface 138 from a second surface 140. The head support arm 116 has a cross-sectional profile at a proximal end 144 for which each of the first surface 138 and the second surface 140 forms a portion of a polygon, in particular an octagon, as shown in FIG. 14. The head support arm tapers to a flat cross-sectional profile at a distal end 146. There is a swage hole 150 in the flat portion 148 for attachment of a flexure.

Figure 12:
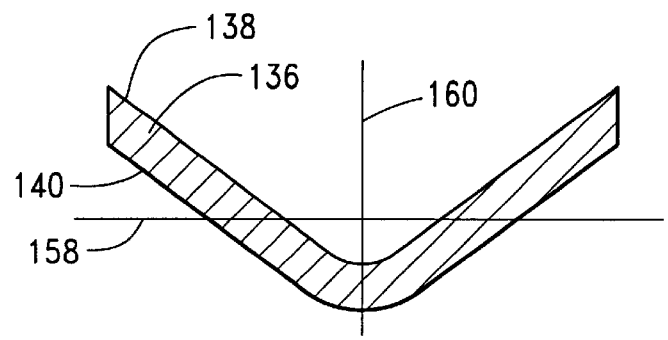
FIG. 12 is a cross-sectional profile of the section 12—12 shown in FIG. 9.

FIG. 12 shows a cross-sectional profile of the section 12—12 shown in FIG. 9. In the profile, each of the first surface 138 and the second surface 140 forms a portion (two sides) of a triangle.

Figure 13:
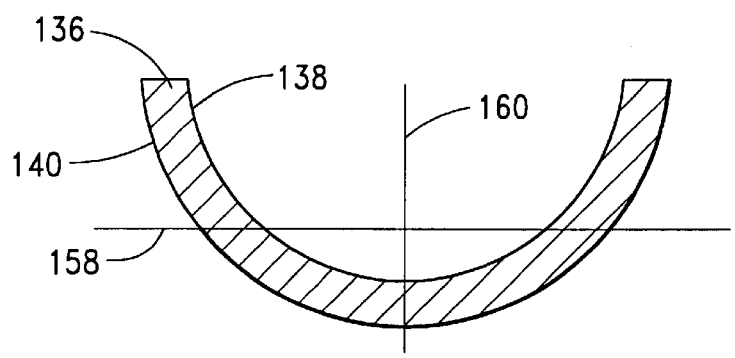
FIG. 13 is a cross-sectional profile of the section 13—13 shown in FIG. 10.

FIG. 13 shows a cross-sectional profile of the section 13—13 shown in FIG. 10. In the profile, each of the first surface 138 and the second surface 140 are U-shaped.

FIG. 14 shows a cross-sectional profile of the section 14—14 shown in FIG. 11. In the profile, each of the first surface 138 and the second surface 140 forms a portion (four sides) of a polygon, in particular an octagon.

In FIGS. 12–14, an axis 158 is a neutral axis about which one may calculate a transverse moment of inertia $I_1$. The transverse moment of inertia is used to calculate the stresses in the head support arm for a force applied to the actuator in the z (transverse) direction. The transverse moment of inertia is also proportional to the stiffness of the head support arm with respect to the z direction.

The stiffness is a measure of the ability of the head support arm to resist deflection to a load applied in a particular direction. In general, the stiffness is a three-dimensional matrix of values. As a rule, an increase in the stiffness causes the natural frequencies of vibration to increase also. For the embodiments shown in FIGS. 12–14, the head support arm 116 is symmetric with respect to the axis 160.

Figure 15:
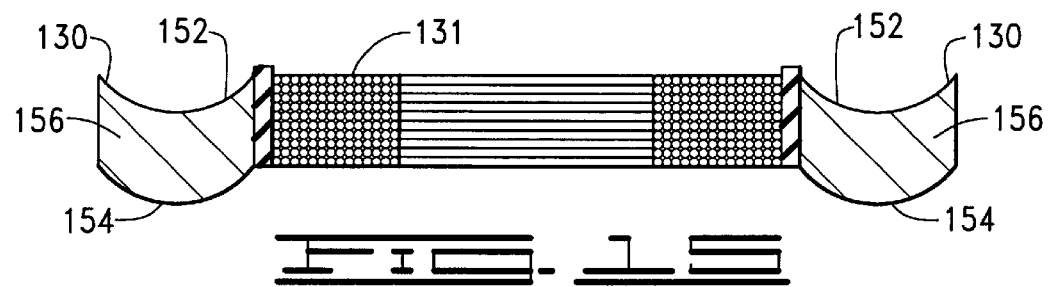
FIG. 15 is a cross-sectional profile of the section 15—15 shown in FIG. 2 for one embodiment of the invention.

FIG. 15 is a cross-sectional profile of section 15—15 shown in FIG. 10. In FIG. 15, a coil yoke 130 extends from the actuator body 128 and has branches 133. The coil yoke 130 supports a coil 131 of a voice coil motor (VCM). Each of the two branches 133 has a shell first surface 152, a shell second surface 154, and a shell core 156 separating the two surfaces 152 and 154.

The shell coil yoke has the same improvement in stiffness, as compared to flat coil yokes, that the shell head support arms have when compared to flat head support arms. This improvement results because, by being shells, the branches of the coil yoke have greater moments of inertia with respect to the transverse direction and with respect to the angular direction.

The shell head support arms and coil yokes may be made by various processes. One may stamp sheet metal blanks into flat plates and then use standard sheet metal processes to form the shell structures. These standard sheet metal processes may include heating the metal flat plates and conforming the plates to a mandrel using a press or a hammer. Alternatively, one may form head support arms and coil yokes by making suitable molds, placing hot material into the molds and then allowing the material to cool.

In accordance with a preferred embodiment, the present invention provides an actuator assembly 110 to position a read/write head 110 near a disc 106 of a disc drive 100. The actuator assembly 110 has an actuator body 128 with a head support arm 116 and a coil yoke 130 extending therefrom. The coil yoke 130 supports a coil 131, which as part of a VCM 114, causes the actuator body 128 to pivot about a pivot axis 132. The head support arm 116 has a central shell core 136, a first concave shell surface 138, and a second convex shell surface 140. The convex second shell surface 140 is positioned on the opposite side of the central shell 136 core from the concave first surface 138. The convex second shell surface 140 is separated from the concave first shell surface 138 by a thickness of the central shell core 136. The actuator assembly 110 also includes a flexure assembly 118 extending from the head support arm 116. The flexure assembly 118 supports the read/write head 120.

In reference to the claims, the function of supporting the read/write head adjacent the disc is performed by the actuator assembly 110 as described above and as shown in the attached drawings, and includes a pivotal actuator body 128, from which a shell head support arm 116 extends to in turn support the read/write head 120.

The present invention is well adapted to attain the ends and advantages mentioned as well as those inherent therein. While presently preferred embodiments have been described for purposes of the disclosure, numerous changes may be made which will readily suggest themselves to those skilled in the art and which are encompassed in the spirit of the invention disclosed and defined in the appended claims.

What is claimed is:

1. An actuator assembly to position a read/write head near a disc of a computer disc drive system, comprising:
   (a) an actuator body;
   (b) a head support arm attached to the actuator body, the head support arm comprising:
      (b1) a central shell core having a thickness;
      (b2) a concave first shell surface communicating with the actuator body; and
      (b3) a convex second shell surface positioned on the opposite side of the central shell core from the first shell surface and separated from the first shell surface by the shell core thickness; and
   (c) a flexure assembly extending from the head support arm, the flexure configured to support the read/write head.

2. The actuator assembly of claim 1 wherein each of the first shell surface and the second shell surface of the head support arm is of smooth curvature.

3. The actuator assembly of claim 1 wherein the thickness of the shell core is substantially uniform.

4. The actuator assembly of claim 1 wherein, in a cross-sectional profile, each of the first shell surface and the second shell surface of the head support arm forms a portion of a triangle.

5. The actuator assembly of claim 1 wherein, in a cross-sectional profile, each of the first shell surface and the second shell surface of the head support arm forms a portion of a polygon having at least five sides.

6. The actuator assembly of claim 1 further comprising:
   (d) a coil; and
   (e) a coil yoke attached to the actuator body and supporting the coil, the coil yoke comprising:
      (e1) a central coil yoke core having a thickness;
      (e2) a concave first coil yoke surface; and
      (e3) a convex second coil yoke surface positioned on the opposite side of the coil yoke central core from the first coil yoke surface and separated from the first coil yoke surface by the coil yoke core thickness.

7. The actuator assembly of claim 1 wherein the head support arm further comprises a lightening hole.

8. An actuator assembly to position a read/write head near a disc of a computer disc drive system, comprising:
   (a) an actuator body;
   (b) a head support arm attached to the actuator body, the head support arm comprising:
      (b1) a central shell core having a thickness,
      (b2) a concave first shell surface; and
      (b3) a convex second shell surface positioned on the opposite side of the central shell core from the first shell surface and separated from the first shell surface by the shell core thickness, and wherein, in a cross-sectional profile, each of the first shell surface and the second shell surface of the head support arm forms a portion of a polygon; and
   (c) a flexure assembly extending from the head support arm, the flexure configured to support the read/write head.

9. A disc drive comprising:
   (a) a disc mounted to the spindle motor for rotation about the central axis, the disc having a recording surface;
   (b) a read/write head to write data to the disc and to read data from the disc;
   (c) an actuator assembly to position a read/write head near a disc of a computer disc drive system, comprising:
      (c1) an actuator body; and
      (c2) an actuator body extension attached to the actuator the actuator body extension comprising:
         (c2i) an extension shell core having a thickness;
         (c2ii) an extension concave first surface communicating with the actuator body; and
         (c2iii) an extension convex second surface positioned on the opposite side of the shell core from the first surface and separated from the first surface by the shell core thickness.

10. The disc drive of claim 9 wherein each of the first surface and the second surface of the extension is of smooth curvature.

11. The disc drive of claim 9 wherein, in a cross-sectional profile, each of the first surface and the second surface of the extension forms a portion of a triangle.

12. The disc drive of claim 9 wherein, in a cross-sectional profile, each of the first surface and the second surface of the extension forms a portion of a polygon.

13. The disc drive of claim 9 wherein, in a cross-sectional profile, each of the first surface and the second surface of the extension forms a portion of a polygon having at least five sides.

14. The disc drive of claim 9 wherein the extension is a head support arm which supports the head adjacent the disc.

15. The disc drive of claim 9 wherein the extension is a coil yoke.

16. A computer disc drive system comprising:
   (a) a rotatable disc;
   (b) a read/write head to write data to the disc and to read data from the disc; and
   (c) means for positioning the read/write head near the disc.

* * * * *